US012132984B2

(12) United States Patent
Watola et al.

(10) Patent No.: US 12,132,984 B2
(45) Date of Patent: *Oct. 29, 2024

(54) ADAPTIVE SYSTEM FOR AUTONOMOUS MACHINE LEARNING AND CONTROL IN WEARABLE AUGMENTED REALITY AND VIRTUAL REALITY VISUAL AIDS

(71) Applicant: Eyedaptic, Inc., Laguna Niguel, CA (US)

(72) Inventors: David A. Watola, Irvine, CA (US); Jay E. Cormier, Laguna Niguel, CA (US); Brian Kim, San Clemente, CA (US)

(73) Assignee: Eyedaptic, Inc., Laguna Niguel, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/069,506

(22) Filed: Dec. 21, 2022

(65) Prior Publication Data

US 2023/0276122 A1 Aug. 31, 2023

Related U.S. Application Data

(63) Continuation of application No. 16/294,601, filed on Mar. 6, 2019, now Pat. No. 11,563,885.

(60) Provisional application No. 62/639,347, filed on Mar. 6, 2018.

(51) Int. Cl.
*H04N 23/60* (2023.01)
*H04N 23/62* (2023.01)
*H04N 23/68* (2023.01)
*H04N 23/951* (2023.01)

(52) U.S. Cl.
CPC .............. *H04N 23/64* (2023.01); *H04N 23/62* (2023.01); *H04N 23/681* (2023.01); *H04N 23/951* (2023.01)

(58) Field of Classification Search
CPC ...... H04N 23/64; H04N 23/62; H04N 23/681; H04N 23/951
See application file for complete search history.

(56) References Cited

U.S. PATENT DOCUMENTS

| 5,546,099 A | 8/1996 | Quint et al. |
| 5,777,715 A | 7/1998 | Kruegle et al. |
| 5,892,570 A | 4/1999 | Stevens |
| 6,418,122 B1 | 7/2002 | Schoenblum et al. |

(Continued)

FOREIGN PATENT DOCUMENTS

| CA | 2916780 A1 | 10/2008 |
| CA | 164180 S | 9/2016 |

(Continued)

OTHER PUBLICATIONS

Nomoto et al.; Prototype and evaluation of magnifying reader using image processing; Proceedings of the 2011 JSME Conference on Robotics and Mechatronics; The Japan Society of Mechanical Engineers; pp. 2784-2785; (Abstract Only) May 2011.

(Continued)

*Primary Examiner* — Ahmed A Berhan
(74) *Attorney, Agent, or Firm* — Shay Glenn LLP

(57) ABSTRACT

Adaptive control systems using augmented and virtual reality systems chimerically integrated with Artificial Intelligence and the like Homunculi fix vision issues with data based and user tuned solutions in real time.

15 Claims, 4 Drawing Sheets

(56) References Cited

U.S. PATENT DOCUMENTS

| | | |
|---|---|---|
| 8,384,999 B1 | 2/2013 | Crosby et al. |
| 8,976,086 B2 | 3/2015 | Hilkes |
| 9,516,283 B2 | 12/2016 | Hilkes et al. |
| 9,782,084 B2 | 10/2017 | Maertz |
| 10,091,414 B2 * | 10/2018 | Chan .................. H04N 23/63 |
| 10,347,048 B2 | 7/2019 | Fu et al. |
| 10,397,560 B2 | 8/2019 | Miyao et al. |
| 10,429,675 B2 | 10/2019 | Greget |
| 10,459,254 B2 * | 10/2019 | Antaki ............ G02B 27/0093 |
| 10,564,714 B2 | 2/2020 | Marggraff et al. |
| 10,869,026 B2 | 12/2020 | Gupta |
| 10,872,472 B2 | 12/2020 | Watola et al. |
| 10,950,049 B1 | 3/2021 | Kelly et al. |
| 10,963,999 B2 | 3/2021 | Werblin et al. |
| 10,984,508 B2 | 4/2021 | Kim et al. |
| 11,016,302 B2 | 5/2021 | Freeman et al. |
| 11,030,975 B2 | 6/2021 | Nishibe et al. |
| 11,031,120 B1 | 6/2021 | Freeman et al. |
| 11,043,036 B2 | 6/2021 | Kim et al. |
| 11,132,055 B2 | 9/2021 | Jones et al. |
| 11,187,906 B2 | 11/2021 | Watola et al. |
| 11,282,284 B2 | 3/2022 | Watola et al. |
| 11,372,479 B2 | 6/2022 | Bradley et al. |
| 11,385,468 B2 | 7/2022 | Watola et al. |
| 11,521,360 B2 | 12/2022 | Kim et al. |
| 11,546,527 B2 | 1/2023 | Werblin et al. |
| 11,563,885 B2 | 1/2023 | Watola et al. |
| 11,676,352 B2 | 6/2023 | Watola et al. |
| 11,819,273 B2 | 11/2023 | Freeman et al. |
| 11,956,414 B2 | 4/2024 | Freeman et al. |
| 12,062,430 B2 | 8/2024 | Riggs et al. |
| 2007/0200927 A1 | 8/2007 | Krenik |
| 2008/0013047 A1 | 1/2008 | Todd et al. |
| 2008/0247620 A1 | 10/2008 | Lewis et al. |
| 2008/0309878 A1 | 12/2008 | Hirji |
| 2009/0273758 A1 | 11/2009 | Wang et al. |
| 2011/0043644 A1 | 2/2011 | Munger et al. |
| 2011/0109876 A1 | 5/2011 | Reichow et al. |
| 2011/0181692 A1 | 7/2011 | Kuno |
| 2011/0227813 A1 | 9/2011 | Haddick et al. |
| 2011/0285960 A1 | 11/2011 | Kohn et al. |
| 2012/0206452 A1 | 8/2012 | Geisner et al. |
| 2012/0242865 A1 | 9/2012 | Vartanian et al. |
| 2012/0309529 A1 | 12/2012 | Westlund et al. |
| 2013/0021373 A1 | 1/2013 | Vaught et al. |
| 2013/0127980 A1 | 5/2013 | Haddick et al. |
| 2013/0215147 A1 | 8/2013 | Hilkes et al. |
| 2014/0002475 A1 | 1/2014 | Oh |
| 2014/0053111 A1 | 2/2014 | Beckman |
| 2014/0063062 A1 | 3/2014 | Fateh |
| 2014/0152530 A1 | 6/2014 | Venkatesha et al. |
| 2014/0210970 A1 | 7/2014 | Dalal et al. |
| 2015/0002808 A1 | 1/2015 | Rizzo, III et al. |
| 2015/0355481 A1 | 12/2015 | Hilkes et al. |
| 2016/0033771 A1 | 2/2016 | Tremblay et al. |
| 2016/0037025 A1 | 2/2016 | Blum |
| 2016/0041615 A1 | 2/2016 | Ikeda |
| 2016/0085302 A1 | 3/2016 | Publicover et al. |
| 2016/0116979 A1 | 4/2016 | Border |
| 2016/0156850 A1 | 6/2016 | Werblin et al. |
| 2016/0171779 A1 | 6/2016 | Bar-Zeev et al. |
| 2016/0178912 A1 | 6/2016 | Kusuda et al. |
| 2016/0180591 A1 | 6/2016 | Shlu et al. |
| 2016/0187654 A1 | 6/2016 | Border et al. |
| 2016/0187969 A1 | 6/2016 | Larsen et al. |
| 2016/0216515 A1 | 7/2016 | Bouchier et al. |
| 2016/0235291 A1 | 8/2016 | Goh et al. |
| 2016/0246057 A1 | 8/2016 | Hasegawa et al. |
| 2016/0264051 A1 | 9/2016 | Werblin |
| 2016/0270648 A1 | 9/2016 | Freeman et al. |
| 2016/0270656 A1 | 9/2016 | Samec et al. |
| 2016/0274381 A1 | 9/2016 | Haddadi |
| 2016/0314564 A1 | 10/2016 | Jones et al. |
| 2016/0349509 A1 | 12/2016 | Lanier et al. |
| 2016/0363770 A1 | 12/2016 | Kim et al. |
| 2016/0377865 A1 | 12/2016 | Alexander et al. |
| 2017/0068119 A1 * | 3/2017 | Antaki .................. G06F 3/012 |
| 2017/0084203 A1 | 3/2017 | Aguren |
| 2017/0176748 A1 | 6/2017 | Kim |
| 2017/0185723 A1 | 6/2017 | McCallum et al. |
| 2017/0200296 A1 | 7/2017 | Jones et al. |
| 2017/0221264 A1 | 8/2017 | Perry |
| 2017/0249862 A1 | 8/2017 | Border |
| 2017/0273552 A1 | 9/2017 | Leung et al. |
| 2017/0287222 A1 | 10/2017 | Fujimaki |
| 2017/0343822 A1 | 11/2017 | Border et al. |
| 2017/0365101 A1 | 12/2017 | Samec et al. |
| 2017/0372225 A1 | 12/2017 | Foresti |
| 2018/0005419 A1 | 1/2018 | Hao et al. |
| 2018/0052326 A1 | 2/2018 | Wall et al. |
| 2018/0077409 A1 | 3/2018 | Heo et al. |
| 2018/0103917 A1 | 4/2018 | Kim et al. |
| 2018/0104106 A1 | 4/2018 | Lee et al. |
| 2018/0144554 A1 | 5/2018 | Watola et al. |
| 2018/0150132 A1 | 5/2018 | Xiao et al. |
| 2018/0203231 A1 | 7/2018 | Glik et al. |
| 2018/0217380 A1 | 8/2018 | Nishimaki et al. |
| 2018/0249151 A1 | 8/2018 | Freeman et al. |
| 2018/0365877 A1 | 12/2018 | Watola et al. |
| 2019/0012841 A1 | 1/2019 | Kim et al. |
| 2019/0041642 A1 | 2/2019 | Haddick et al. |
| 2019/0279407 A1 | 9/2019 | McHugh et al. |
| 2019/0331920 A1 | 10/2019 | Watola et al. |
| 2019/0331922 A1 | 10/2019 | Kim et al. |
| 2019/0339528 A1 | 11/2019 | Freeman et al. |
| 2019/0385342 A1 | 12/2019 | Freeman et al. |
| 2020/0371311 A1 | 11/2020 | Lobachinsky et al. |
| 2021/0022599 A1 | 1/2021 | Freeman et al. |
| 2021/0241434 A1 | 8/2021 | Kim et al. |
| 2021/0257084 A1 | 8/2021 | Freeman et al. |
| 2021/0271318 A1 | 9/2021 | Bradley et al. |
| 2021/0373656 A1 | 12/2021 | Watola et al. |
| 2022/0005587 A1 | 1/2022 | Freeman et al. |
| 2022/0171456 A1 | 6/2022 | Siddiqi et al. |
| 2022/0284683 A1 | 9/2022 | Watola et al. |
| 2023/0044529 A1 | 2/2023 | Watola et al. |
| 2023/0072493 A1 | 3/2023 | Werblin et al. |
| 2024/0061253 A1 | 2/2024 | Watola et al. |

FOREIGN PATENT DOCUMENTS

| | | |
|---|---|---|
| CA | 3043204 C | 8/2021 |
| CA | 2991644 A1 | 3/2022 |
| CA | 3084546 C | 1/2023 |
| CA | 3069173 C | 5/2023 |
| CN | 104076513 A | 10/2014 |
| CN | 104306102 A | 1/2015 |
| CN | 105930819 A | 9/2016 |
| CN | 112534467 A | 3/2021 |
| CN | 108475001 B | 6/2021 |
| CN | 215313595 U | 12/2021 |
| CN | 215313596 U | 12/2021 |
| CN | 114063302 A | 2/2022 |
| CN | 107121070 B | 3/2023 |
| EP | 2674805 A2 | 12/2013 |
| EP | 3830630 A4 | 1/2023 |
| EP | 2621169 B1 | 7/2023 |
| JP | 2017049916 A | 3/2017 |
| JP | 2017120550 A | 7/2017 |
| KR | 20140066258 A | 5/2014 |
| WO | WO2008/119187 A1 | 10/2008 |
| WO | WO2011/060525 A1 | 5/2011 |
| WO | WO2013/120180 A1 | 8/2013 |
| WO | WO2013/177654 A1 | 12/2013 |
| WO | WO2014/107261 A1 | 7/2014 |
| WO | WO2016/036860 A1 | 3/2016 |
| WO | WO2016/077343 A1 | 5/2016 |
| WO | WO2016/144419 A1 | 9/2016 |
| WO | WO2016/149536 A1 | 9/2016 |
| WO | WO2016/168913 A1 | 10/2016 |
| WO | WO2017/059522 A1 | 4/2017 |
| WO | WO2018/200717 A1 | 11/2018 |

(56) References Cited

FOREIGN PATENT DOCUMENTS

| WO | WO2020/014705 A1 | 1/2020 |
| WO | WO2020/014707 A1 | 1/2020 |
| WO | WO2021/003406 A1 | 1/2021 |

OTHER PUBLICATIONS

Watola et al.; U.S. Appl. No. 18/310,095 entitled "Systems for augmented reality visual aids and tools," filed May 1, 2023.

Carroll et al.; Visual field testing:from one medical student to another; 18 pages; retrieved from the internet (http://eyerounds.org/tutorials/VF-testing/); Aug. 22, 2013.

Gonzalez; Advanced imaging in Head-Mounted Displays for Patients with Age-Related Macular Degeneration; Doctoral dissertation; Technical University of Munich; p. 1-129; 2011 (the year of publication is sufficiently earlier than the effective U.S. filing date and any foreign priority date so that the particular month of publication is not in issue).

Hwang et al.; An augmented-reality edge enhancement application for Google Glass; Optometry and vision science; 91(8); pp. 1021-1030; Aug. 1, 2014.

Unser et al.; B-spline signal processing: Part II—efficient design and applicationtions; IEEE Transactions on Signal Processing: 41(2); pp. 834-848; Feb. 1993.

Unser et al.; B-spline signal processing: part I—theory; IEEE Transactions on Signal Processing: 41(2)); pp. 821-832; Feb. 1993.

Unser et al.; TheL2 polynomial spline pyramid; IEEE Transactions on Pattern Analysis and Machine Intelligence; 15(4); pp. 364-379; Apr. 1993.

Unser; Splines—a perfect fit for signal and image processing; IEEE Signal Processing Magazine; 16 (Article); pp. 22-38; Nov. 1999.

Kim et al.; U.S. Appl. No. 18/052,313 entitled "Artificial intelligence enhanced system for adaptive control driven ar/vr visual aids," filed Nov. 3, 2022.

Watola et al.; U.S. Appl. No. 18/344,337 entitled "Enhanced autonomous hands-free control in electronic visual aids," filed Jun. 29, 2023.

\* cited by examiner

ADAPTIVE SYSTEM FOR AUTONOMOUS MACHINE LEARNING AND CONTROL IN WEARABLE AUGMENTED REALITY AND VIRTUAL REALITY VISUAL AIDS

CROSS-REFERENCE TO RELATED APPLICATIONS

This application is a continuation of U.S. application Ser. No. 16/294,601, titled "Adaptive System for Autonomous Machine Learning and Control in Wearable Augmented Reality and Virtual Reality Visual Aids," filed Mar. 6, 2019, which claims all priority rights, and Paris Convention right available under U.S. Ser. No. 62/639,347, dated Mar. 6, 2018, by the present inventors. Likewise, expressly incorporated by herein by reference as if fully set forth herein are: U.S. Provisional Patent Application No. 62/470,297, filed Mar. 12, 2017; U.S. Provisional Patent Application No. 62/530,286, filed Jul. 9, 2017; U.S. Provisional Patent Application No. 62/530,792, filed Jul. 10, 2017; U.S. Provisional Patent Application No. 62/579,657, filed Oct. 31, 2017; U.S. Provisional Patent Application No. 62/579,798, filed Oct. 31, 2017; PCT Patent Application No. PCT/US17/62421, filed Nov. 17, 2017; U.S. Letters Patent application Ser. No. 15/817,117, filed Nov. 17, 2017; U.S. Letters Patent application Ser. No. 15/918,884, filed Mar. 12, 2018; U.S. Provisional Patent Application No. 62/677,463, filed May 29, 2018; U.S. Letters Patent application Ser. No. 16/030,788, filed Jul. 9, 2018; U.S. Provisional Patent Application No. 62/735,643, filed Sep. 24, 2018; and U.S. Letters Patent application Ser. No. 16/177,333, filed Oct. 31, 2018. Each of these cases is assigned, along with all related pending and issued/granted progeny to Eyedaptic®, Inc. (Orange County, CA).

BACKGROUND OF THE INVENTIONS

The present inventions relate to autonomous machine learning. In particular, the present inventions teach manifestations of control of the same, for and by, Visual Aids for Augmented—and Virtual Reality depictions of simulacra of extant visual fields with enhancement, wearable, portable or otherwise disposed proximate to users for the benefit of increased visual acuity and functionality.

OBJECT AND SUMMARY OF THE INVENTIONS

Briefly stated, adaptive control systems using augmented and virtual reality systems chimerically integrated with Artificial Intelligence and the like Homunculi fix vision issues with data based and user tuned solutions in real-time.

According to features of the present invention there are describe improved electronic visual aid systems which comprise in combination; a software mechanism for continuous application of image processing to input video streams from at least one camera-means outputted to at least a display; and a plurality of interactive controls effective to affect operating functionality by manipulation of internal state parameters; manifested in an A/R or V/R output presented to a user via head-mounted display or simulated otherwise.

The inventions described herein relate to the automatic setting and adjustment of controls for a wearable personal electronic visual aid, which assists users suffering from various visual impairments (e.g. Age-related Macular Degeneration—AMD—and other visual field deficiencies) by improving their ability to perceive and interpret their surroundings. Most of these devices incorporate one or more cameras (i.e. image sensors and supporting optics) to capture a continuous stream of environmental images, some form of low-latency processing to adjust, augment, or enhance the images in ways that suit the needs of the wearer, and one or more displays to present the modified images for real-time viewing. Likewise embraced within the ambit of the instant teachings are portable systems which demonstrate, teach or other utilize the instant features.

An effective visual aid must perform sophisticated image processing operations that consider not only the wearer's disease state, but also personal preferences, the current environment, and the user's intended focus of attention. Although the particulars of disease state and preferences can be effectively captured as stored device settings, manual optimization of initial user-dependent technical configuration parameters is a painstaking process that generally lies beyond the capabilities of untrained personnel; for the vision impaired or technophobic, it is completely unfeasible without assistance. Similarly, the timely manipulation of detailed controls in response to transient circumstances can also be challenging, particularly for elderly users with reduced manual dexterity. Even able-bodied users would prefer to avoid the distraction of fumbling for controls to make an adjustment.

One way to address these problems is by incorporating a degree of autonomy into the visual aid, allowing it to infer the wearer's immediate needs or intentions and act preemptively on the user's behalf. Decisions would ideally be predicated on an assessment of the situation via analysis of image contents, ancillary sensor data, and historical user actions under similar circumstances. When coupled with a suitable nominal setup procedure, this capability serves as a bootstrap granting immediate baseline utility while the neophyte user gradually gains familiarity
 and ultimately attains proficiency—with fine-grained controls. Meanwhile, the autonomous system continuously monitors user control inputs along with image and sensor data, learning to make increasingly accurate predictions by analyzing patterns and adapting to user idiosyncrasies. Eventually, a dynamic equilibrium is realized where the user primarily makes simple adjustments on relatively rare occasions, with more effort required only under novel conditions.

As described above, this autonomous Machine Learning (ML) system seems an overwhelmingly complex entity because it apparently encompasses a number of difficult tasks: image recognition, scene analysis, and—most significantly—inference and prediction of human intentions. Presented below is a practical method to bound and restrict the scope of these tasks, simplifying them within the context of the electronic visual aid so that they can readily be decomposed into a hierarchy of smaller problems amenable to efficient practical solutions. Implementation details that address important subsidiary practical issues, such as realization on a wearable platform and interactive performance, are also tackled.

DETAILED DESCRIPTIONS

Figure 1:
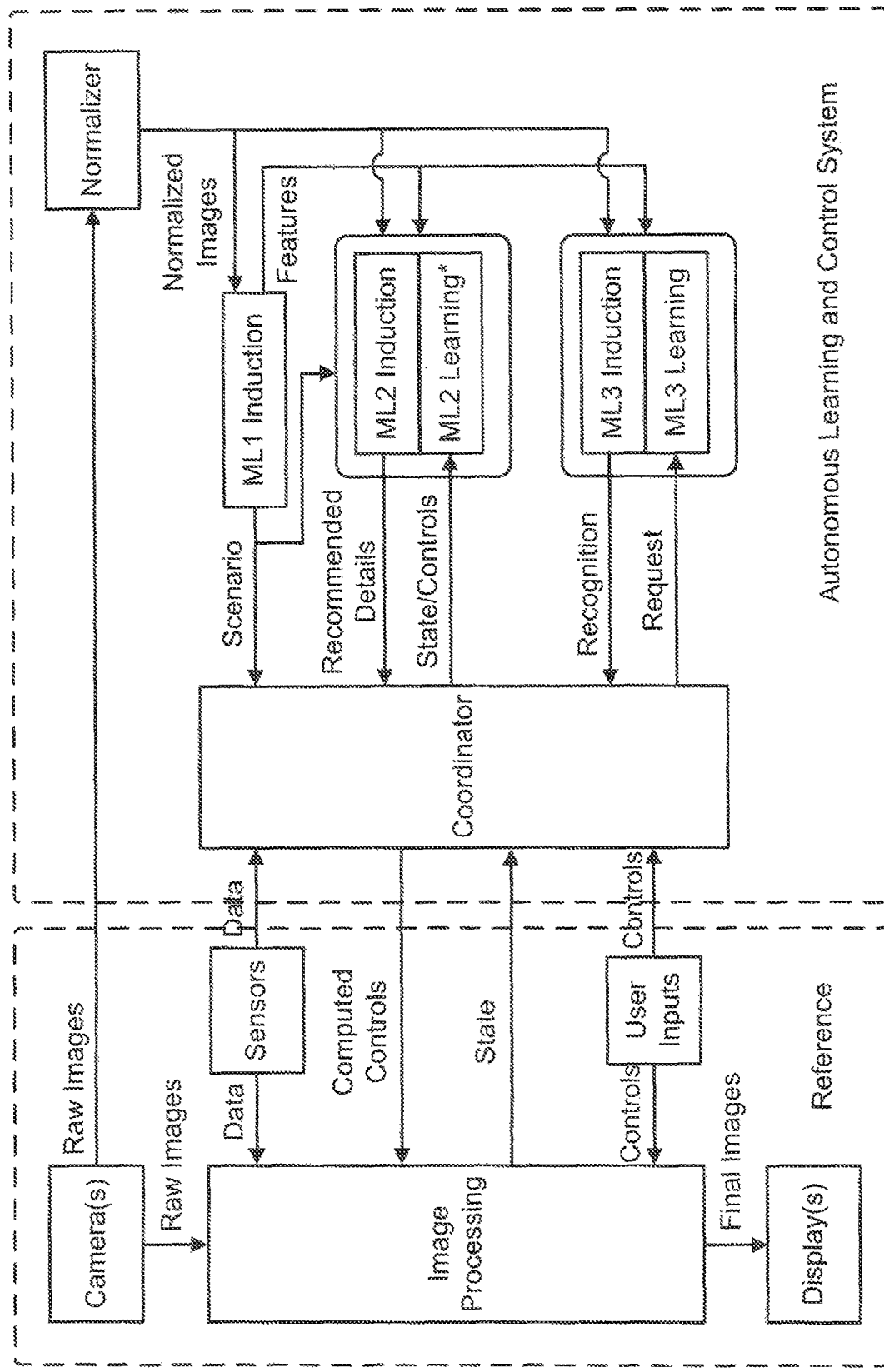
FIG. 1 is a high-level block diagram showing major components, processes, dataflow and interactions in an autonomous control and learning system for low-vision users in a wearable electronic visual aid device.

FIG. 1 is a high-level block diagram showing the main components of the machine learning system as it interacts with the user and the rest of the wearable electronic visual aid device.

The leftmost portion of the figure, enclosed within a dashed rectangle, depicts an exemplary notional device that lacks the autonomous control enabled by the present inventions. In all subsequent text, this shall be known as the Reference since it possesses only baseline functionality that will be extended by the inventions to be disclosed. Here the Reference is represented in greatly simplified form, with nearly all of its functionality abstracted into a monolithic Image Processing block. Regardless of implementation details and feature sets, any Reference electronic visual aid can be considered an opaque processor that continuously accepts the raw image stream from the Camera(s) as input, applies various computations and manipulations to incoming images as directed by manual User Inputs (e.g. buttons or gestures) with possible mediation by additional Sensors (e.g. gyroscopes for image stabilization), and ultimately presents fully-processed images on one or more Display devices.

The rightmost section of FIG. 1, encapsulated by a second (and larger) dashed rectangle labeled "Autonomous Learning and Control System" (ALCS), reveals the main components of the invention. From the diagram, it is evident that adding the desired new functionality to an electronic visual aid incurs relatively simple interface requirements. All inputs to the Image Processing chain (camera images, sensor data, and user controls) must be supplied, along with the current state—the collection of settings and parameters that directly control Image Processing behavior. Outputs are transmitted back to the core of the notional device as Computed Controls that update the state. Although these Computed Controls are somewhat analogous to User Inputs, they are considerably more powerful since the autonomous control system can freely manipulate low-level parameters with few, if any, restrictions.

The ALCS comprises three distinct types of Machine Learning (ML) systems operating in tandem under the direction of a simple Coordinator. This Coordinator is an embedded software process responsible for grading ML decisions, collecting training data for ML learning updates, computing desired control outputs, and regulating state changes so they are only initiated under safe and meaningful conditions. For example, the Coordinator considers real-time sensor data to guarantee that images are ignored during significant head rotations (when image motion blur is likely, and focused attention is unlikely) or acceleration (when large-scale body movements are occurring, and vision changes may be disorienting). The Coordinator also refrains from exercising its control abilities when incoming state information indicates that some other higher-priority mechanism (hidden here within the Image Processing black-box) has seized control. Finally, it also judges the reliability and consistency of the outputs from the various ML systems, regulating its state updates so that ambiguous or unstable inputs and stray head movements do not result in a confusing or surprising display.

The Normalizer in the figure pre-processes the video stream from the Camera, delivering only "normalized" images to the ML blocks. Its purpose is to decouple the Reference camera characteristics from the requirements of downstream analysis and decision functions. Thus, cameras with differing mounting positions (relative to the eye line of the wearer), fields of view, lens characteristics, or pixel resolution can have their images adjusted to simulate being captured in a common format. When the device camera output already conforms to this standard format, the Normalizer can be omitted; otherwise, any necessary camera view transformations, lens corrections, and resolution changes are efficiently implemented using a simple OpenGL shader on an embedded Graphics Processor Unit (GPU).

The set of three ML systems ingest the normalized images and collectively determine the appropriate device settings. Automatically choosing correct settings for the electronic visual aid is a complex problem. It requires awareness not only of the environment, which can in principle be readily obtained by examining camera images, but also the wearer's intentions. Analyzing the environment is itself a formidable challenge. Before describing the individual ML systems in detail and revealing how the partitioning scheme helps address these difficult problems, it is necessary to present some additional background.

Problem Decomposition

Reference devices designed in accordance with accepted modern engineering practices provide a set of device features intended to address certain aspects of a disease or condition that negatively impacts vision; those device features are in turn controlled in some organized fashion by the device state. It is a crucial observation that any full state configuration can be readily decomposed into two portions, where the first part (the "Template") itself constitutes a complete valid state configuration while the other acts as a set of fine-grained modifications (the "Detail") applied to the first.

For any given Reference device intended to provide aid for a bounded class of conditions, common usage patterns will arise that allow a small number of archetypical basis patterns to be identified as Templates, with most practical situations only requiring relatively small adjustments from the closest archetype. Selecting a set of Templates that effectively spans the application space is the key to reducing the complexity of the scene identification and parameter selection problems. The goals then change to determining which Template belongs with the scene, followed by selecting the appropriate Details. To appreciate fully how this simplifies the problem, it is necessary to realize that Templates are user-independent; while the exact settings for each Template may vary from user to user, each one corresponds to an archetype that is user-independent.

Not all decompositions are equally useful, but it is not difficult to rationalize a practical set for a specific, well-defined problem space. For example, consider AMD, where central vision is reduced or lost but peripheral vision remains available. One plausible exemplary Reference device provides increased central magnification, specifically a user-controlled amount of magnification over a user-controlled central portion of the display (with magnification tapering to neutral at the edges). Depending on the user and the task, these two variables must be adjusted to balance magnified details around the center vs. peripheral visibility. Even when accounting for intra-user variations, the following broadly-applicable templates can be established using only common-sense reasoning:

A "Wide" Template with no magnification, for taking in wide vistas (e.g. outdoors) and orienting;

An "Intermediate" Template with moderate magnification to allow reading signs or recognizing faces at indoor distances without sacrificing peripheral awareness;

A "Close" Template with high magnification over most of the display, for reading or close inspection where peripheral visibility is less important.

As will be demonstrated below, it is not important that the specific meanings of "moderate" and "high" magnification will vary from user to user, or that there are three categories instead of two or four—it only matters that a small set of distinct and intuitively meaningful Templates be identified. The existence of additional minor features is also inconsequential: if their effects do not dramatically vary the overall character of the template, then their specific settings in the template are not important—if they are sufficiently orthogonal to the primary template features, they can even be omitted entirely from the template and remain subject only to direct manual control; conversely, a feature that dominates the user experience when active demands the recognition of an additional Template.

The partitioning of machine learning systems into ML1 and ML2 directly reflects the philosophy behind the problem decomposition into Template and Detail presented above. The same is true of the ML1/ML3 pair, since ML2 and ML3 in some sense (as elucidated below) share the same duties.

First Machine Learning System—ML1

The task of the first ML system, ML1, is to analyze the current image and decide which Template is appropriate, then pass this decision (denoted "Scenario" in FIG. 1) to the Coordinator.

For insight into the relative complexity of this task, consider an established solution to a somewhat-related problem: the fully-automatic shooting mode in a commercial DSLR camera. In this task, the camera must autonomously optimize its aperture, shutter time, ISO, white balance, and other controls to yield an aesthetically pleasing photograph. Though implementation details are not publicly available, it is widely reported that Nikon DSLR cameras achieve this using a Machine Learning system that was trained by giving it only a large number of well-formed photographs along with the settings that were used to produce them. Without being programmed with explicit rules or heuristics, the resulting ML network exploits non-obvious statistical patterns concealed within the training data to derive internalized rules that produce excellent results. Successful commercial systems were first deployed well before current Deep Learning (DL) techniques became widespread, so this problem was tractable even when employing ML technology that is well behind the current state of the art. Arsenal, a Kickstarter campaign funded in 2017, provides similar functionality using DL.

By comparison then, the ML1 task of choosing the correct template is easy. Choosing DSLR exposure parameters is a multi-dimensional regression problem rendered even more difficult by the large number of choices for the variables and complex interactions among them. In contrast, ML1 only needs to perform a classification task; in the AMD example above, ML1 must discriminate among three categories. Classification is acknowledged by ML practitioners to be fundamentally much simpler than regression or parameter estimation because it is only necessary to learn boundaries instead of functional mappings or complex relationships.

Note that ML1 does not select the parameters that accompany the Template—these are customized for each user and scenario, but only require nominal effort. In the AMD example above, there are only two controls to adjust for each of two templates (since the "Wide" template requires no processing). Thus, wearer-specific preparation to use ML1 is minimal.

To realize ML1 fully, a training data set must be prepared containing a large number (e.g. thousands, or preferably tens of thousands) of normalized images capturing typical scenes or situations that would be viewed by the wearer of the device. Every image is assigned a definite scenario label corresponding to exactly one Template. These labelled images form the input to a Machine Learning system that is trained using a "supervised learning" algorithm, so-called because the correct desired result (output label) is supplied with the stimulus (input image) so that the accuracy of the system can be tested objectively.

Many different ML architectures are capable of resolving this supervised learning problem. Although circa-2000 ML technology is sufficient to produce satisfactory results, a modern Deep Learning approach characterized by a large number of layers of interconnected processing units is preferred for reasons that will be fully explored in the discussion of ML2.

Figure 2:
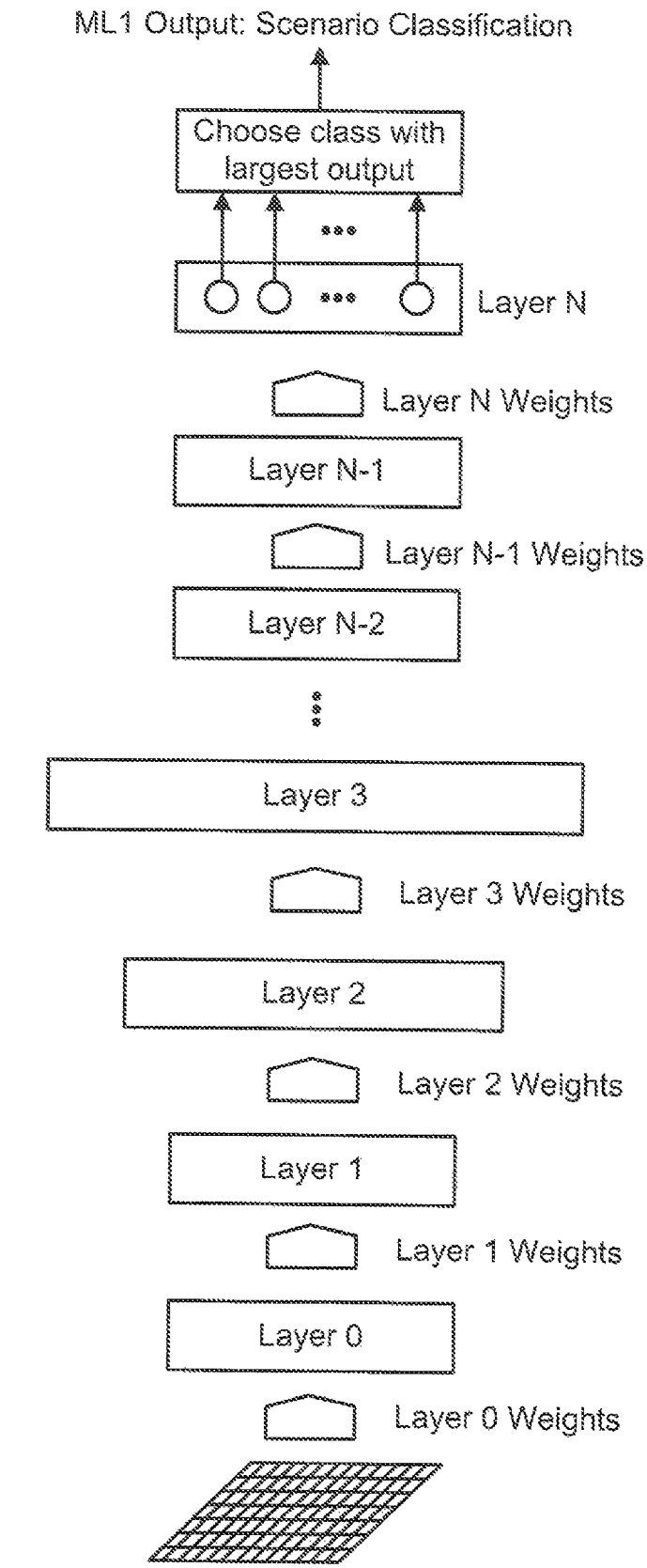
FIG. 2 is a conceptual schematic for the ML1 Machine Learning system, a convolutional Deep Learning classifier that automatically determines which of a small number of categories ("scenarios" or "templates") the electronic visual aid device should be operating in based only on analysis of camera input.

FIG. 2 presents an abstract schematic highlighting important aspects of ML1 architecture. A very conventional convolutional feedforward Deep Learning system is illustrated. It comprises a large number of simple processing units organized into a set of interconnected layers. Connections only exist from the outputs of units in a layer to some or all of the inputs of units in the subsequent (higher-numbered) layer. Each connection has a numerical strength, called its weight—the ensemble of weights and the interconnection patterns determine the exact computation performed by the network, and "learning" consists of adjusting the ensemble to modulate that computation. The exact size of each layer (i.e. number of processing elements) and specific interconnection scheme are abstracted in the figure by representing layers as monolithic rectangles and interconnection networks as irregular pentagons that merely indicate the direction of dataflow; individual processing units only appear (as circles) in the highest layer. Widths of layer rectangles vary to suggest conformance to the conventional practice of increasing layer sizes from the input toward the middle, and similarly reducing size toward the output.

Recipes for selecting and optimizing the actual number of layers, quantity and types of processing units within layers, and interconnection schemes are well-known among ML practitioners and widely available for image classification tasks. Here, the unspecified number of layers is represented by the integer N. Layer 0 (the "input layer"), by convention, has fixed weights all equal to unity and simply outputs a copy of the network inputs. For ML1, the only inputs are the normalized image pixels, depicted as a two-dimensional grid. Because ML1 is a classifier, the number of units in layer N (the "output layer") equals the number of distinct classes (i.e. recognizable Templates, or scenarios), with the unit having the largest computed output deciding the classification result.

Implementation complexity is not a primary concern for ML1. In FIG. 1, ML1 only shows an "Induction" block—unlike ML2 and ML3, which also have "Learning" components. Here, Induction refers to the computationallystraightforward task of making the classification decision, i.e. computing the network output after applying its input. The effort involved is proportional to the size complexity of the internal network in the learning system, but remains simple and deterministic as the input image is propagated through the network and the output of each processor is computed exactly once. Performing low-latency and high-throughput inference, even for highly-interconnected Deep Learning architectures, can be implemented very efficiently even on lightweight mobile processors. For some processors, highly optimized implementations are available. On the other hand, resource-intensive learning or training phases for ML1, which iteratively and incrementally adjust the large number of network weights, occur entirely off-line and can thus exploit considerable computing resources. All learning is completed prior to first deployment of the device, and the resulting fully-trained ML1 inference apparatus remains identical for all users and potentially never changes its weights.

Second Machine Learning System—ML2

ML2 bridges the gap between the course (but user-specific) settings associated with the archetype identified by ML1 and the final state that would be preferred by the user. Clearly, everything about these Detail adjustments is user-specific, and cannot be supplied by a static, off-the-shelf, or pre-trained network. Hence, ML2 operation must incorporate both Inference and Learning aspects as noted in FIG. 1.

For a brand new device (or one that has been re-initialized for a new user), ML2 is a blank slate—the device must rely solely on ML1 and/or direct user interactions to drive changes in device state. Fortunately, ML1 was carefully constructed to provide a viable starting point since it always selects a well-defined scenario from a small menu of available choices. The network that underlies ML2, however, needs to be trained, and both the user and ML1 bootstrap cooperate to facilitate this process.

ML2 is essentially a Deep Learning recommendation system that delivers Detail state updates to the Coordinator. Much as the well-known Nest thermostat observes user inputs and behavior patterns to learn preferences based on time and temperature, ML2 also gradually learns user preferred device configurations that match the contents of the input image. This is necessarily a supervised learning task, which means that labelled data must be provided to drive network training.

Fortunately, those labels are readily available. Every time the user manipulates a control or otherwise makes a manual adjustment to settings, he or she expresses dissatisfaction with the status quo and a preference for the new state under the current input (image and scenario) conditions. When combined with the current state, user control inputs produce a new state that the user has personally selected. Differences between this preferred state and the ML1 Template state, i.e. the preferred Details, form the supervisory training component for ML2.

It will often be the case that a user needs to apply multiple corrections or to negate a tentative earlier update before a satisfactory preferred state emerges. All transient intermediate states are incidental, hence should not contribute to ML2 training. An internal screening process therefore evaluates the event stream to decide when user inputs have stabilized before declaring a final preferred state that incorporates all relevant control inputs. It is this coalesced state that provides the Detail signal for supervised learning.

Images arriving at the time of the last relevant control activation, immediately afterward, and potentially until the next user input constitute suitable training data. The ML1 decision must also enter as an input, because Details are context-dependent relative to a Template, and also so that ML2 can detect when the user explicitly overrides its choice. This nuance is important because Details are easier to learn when represented as small offsets from a relatively similar prototype Template, and it may be advantageous to provide special handling for this occurrence.

As with ML1, ML2 induction has low computational requirements and efficient realizations. However, learning remains time-consuming and potentially requires access to the entire ensemble of labelled training data. Even if the device is tethered to powerful computing resources (whether by cable or wirelessly), it is unlikely that portable wearable solutions can update the ML2 induction engine in real-time—training latency is more likely to be measured in hours. Instead, training inputs are collected for later batch submission to a remote processor with the resulting modified ML2 network being merged at the next available opportunity. Note that this restriction also allows the screening process mentioned above to be deferred to an offline processor that can perform a thorough analysis so that very reliable coalesced preferred states can be derived without human consideration or intervention.

With the relegation of ML2 learning to an offline processor (denoted in FIG. 1 by an asterisk on the ML2 Learning rectangle), the implementation complexity of ML2 training is not constrained by the computing capabilities of the wearable device. However, it is always desirable to improve convergence speed by reducing the total number of computations. Unlike ML1, the ML2 network does not perform classification—it must produce a Detail configuration containing a set of parameters, essentially performing a multi-dimensional regression. Naturally, this implies increased computation.

Figure 3:
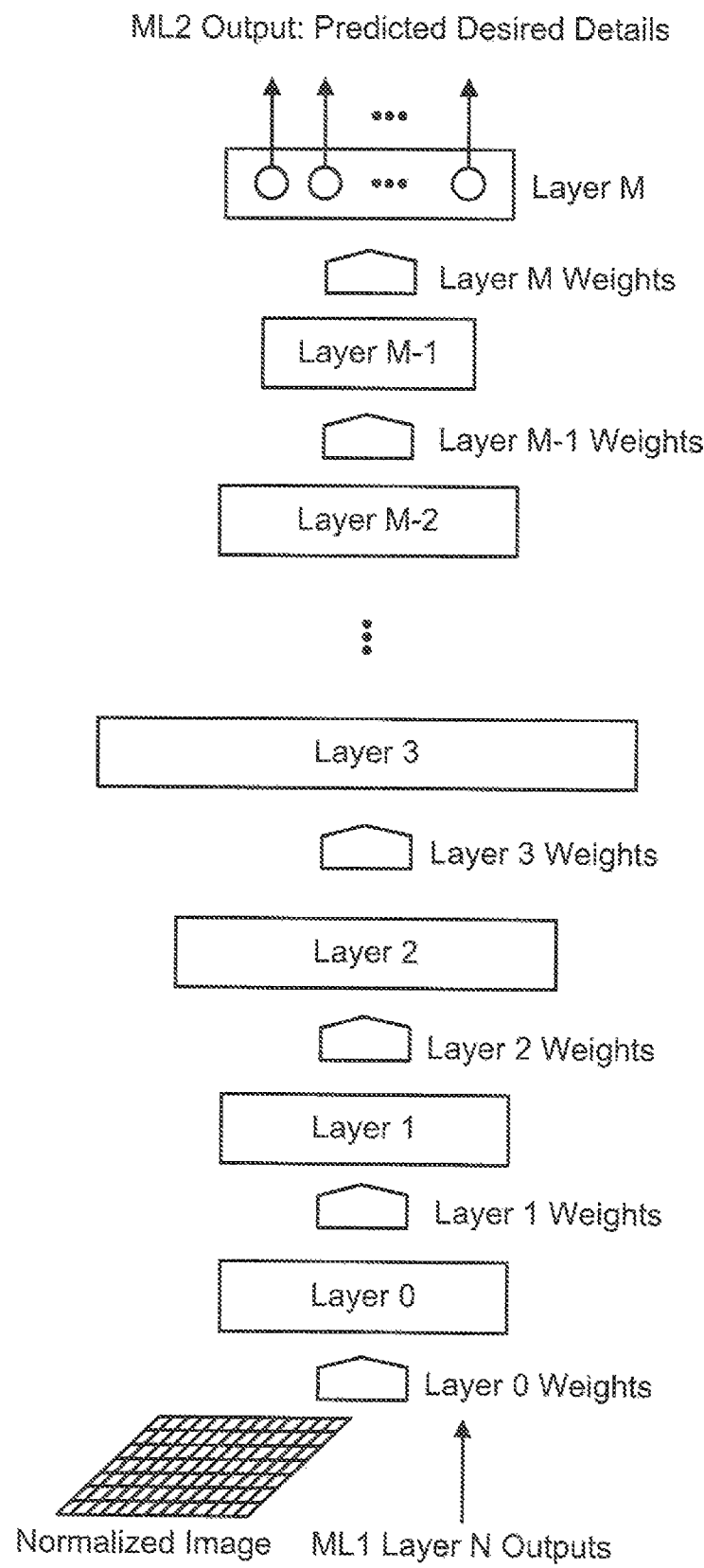
FIG. 3 is a block diagram containing a conceptual schematic for the ML2 Machine Learning system, a convolutional Deep Learning parameter estimator that incrementally learns user preferences to fine-tune electronic visual aid control parameters automatically.

FIG. 3 illustrates ML2 architecture using the same conventions as FIG. 2. At this level of abstraction, ML1 and ML2 look very similar. For ML2, the number of layers is denoted by M. and will generally be different from N. There are also additional inputs since ML2 must also receive the output of ML1 as input. Where ML1 has one output in its final layer for each possible class, ML2 has one output for each state parameter that must be produced as part of a Detail configuration. The apparent similarity is not superficial, but the greater complexity of the ML2 task implies a concomitant increase in representational power—a larger number of processing units and/or network depth, with a corresponding increase in the number of weights.

The task decomposition chosen for this invention provides an important mitigating factor against increased complexity. Recall that ML1 is implemented using a modern convolutional Deep Learning architecture even though simpler legacy architectures suffice. Convolutional Deep Learning networks for image classification can exhibit the remarkable property of self-organizing to discover and isolate individual image features that are useful for the discrimination task. This occurs because supervised learning directly constrains only the inputs and outputs of a multilayer network, leaving internal layers free to self-organize under the guidance of the training algorithm. With the proper training regimen, individual processing elements in higher processing layers of ML1 will respond directly to progressively more complex patterns. These "feature detectors" emerge organically and spontaneously during training, without being designed or requested. For example, units in the lowest layers could detect horizontal or vertical line segments, higher layers might respond to oriented curves or corners, still higher layers could detect simple shapes, and even higher layers might find complex structures. Informally speaking, outputs in higher layers compute conjunctive or disjunctive combinations of lower level features; this process ultimately culminates in successful whole-image classification with a single top-level feature per class. In reality, the detected features are often somewhat abstract and randomly distributed through the network. However, they remain hierarchically organized with increasingly complex structures being "recognized" at higher layers.

The point of this digression into ML1 architecture is that the ML1 features can be used to bootstrap ML2 feature detection. Rather than having ML1 and ML2 be independently-trained Machine Learning systems coupled only through the series connection ML1 output to ML1 input, salient internals of ML1 can be absorbed into ML2 with no impact to ML1 and a positive benefit to ML2. This is possible because both networks share the normalized image pixels as a common set of inputs.

Figure 4:
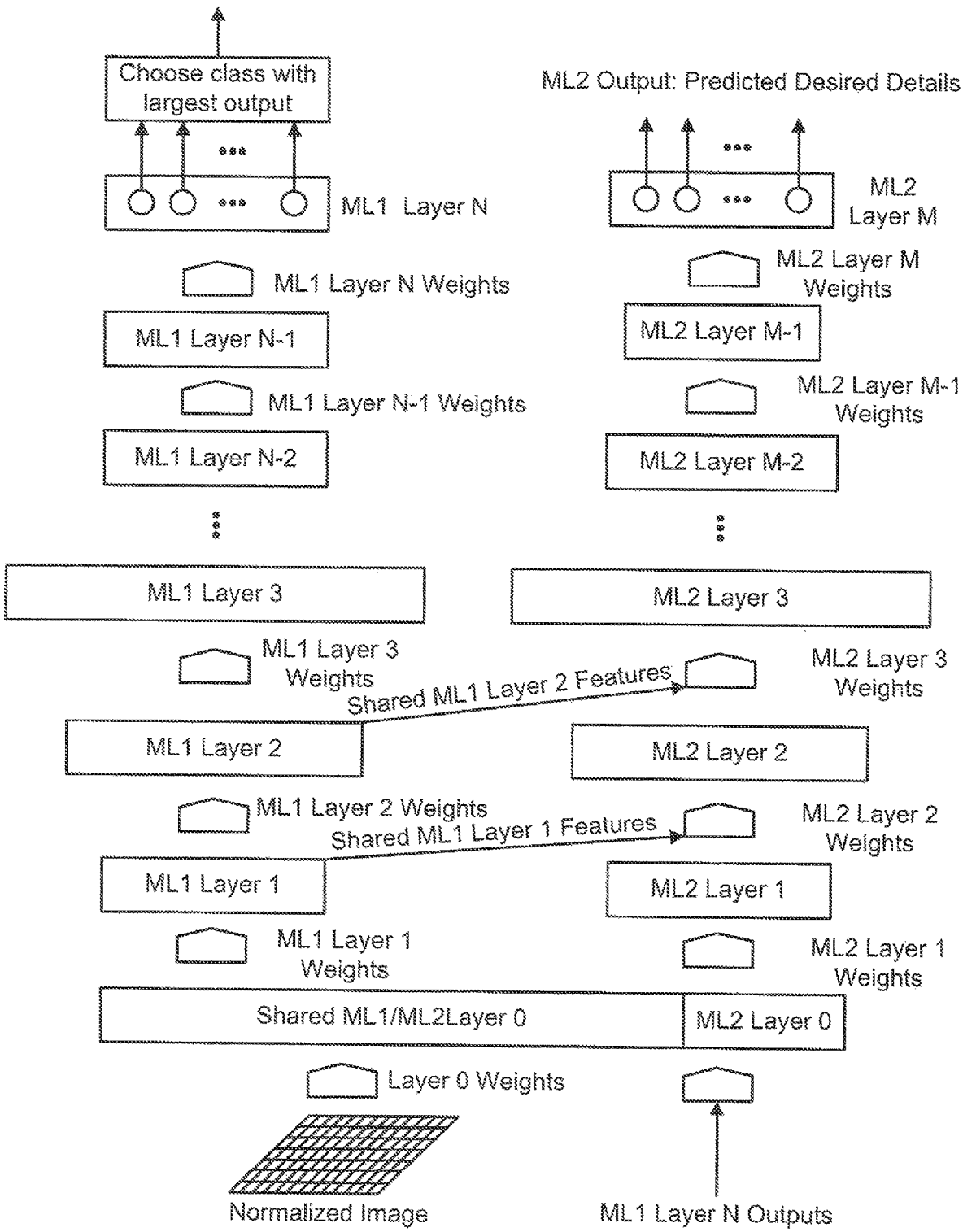
FIG. 4 combines elements from FIGS. 2 and 3, demonstrating how ML1 and ML2 can efficiently share resources and reduce the amount of computation necessary for successful ML2 learning.

This novel configuration is depicted in FIG. 4, where outputs of processing units in ML1 layers are shown having connections into ML2. Only two ML1 layers are explicitly shown to be shared here, and they are only connected into the same layer number in ML2 that they would enter in ML1; these circumstances are examples for didactic purposes only—the optimum arrangement can be found empirically as is common practice in the ML community. Note that shared features effectively become additional inputs to ML2, but they are injected into the network layers higher than the usual input layer (layer 0); this unconventional topology intuitively makes sense because injecting features that already have higher structure into the lowest level is likely to disrupt the natural hierarchical development of organic ML2 features.

Using this shared representation, ML2 then receives the benefit of "precomputed" feature vectors that are known to be useful to the recognition task at hand; this allows the finite ML2 functional complexity resources (i.e. processing units, layers, and interconnections) to be allocated other purposes besides independently re-discovering these redundant features. Although the weights connecting ML1 features to ML2 do increase overall ML2 complexity during learning because they must also be adjusted by the training algorithm, the shared weights contained in ML1 always remain fixed.

Third Machine Learning System—ML3

The third Machine Learning System, ML3, operates in parallel to ML2. It complements ML2 by providing the fast-learning capability that ML2 lacks.

Consider a situation where the user must regularly switch attention between two tasks that require different fields of view. Ideally, he would simply move his head to redirect his gaze, trusting the combination of ML1 and ML2 to configure the visual aid device appropriately. If ML2 does not give a satisfactory result, the user would simply make minor adjustments that would eventually be learned. These changes, however, will not be immediately internalized by ML2 until sufficient training data has been collected, the batch learning update occurs, and the ML2 network weights are updated. Therefore, the user would have to repeat these adjustments each time his focus of attention returned to this task.

ML3 addresses this inconvenience by giving the user a simple (e.g. single-button) interface to request immediate but temporary learning of the association between the current view and current state. By activating this control after making state adjustments, the user causes ML3 to learn the characteristics of the current view along with the latest settings—it effectively becomes an extemporaneously-defined scenario that is recognized by ML3 rather than ML1. After ML1 and ML2 trigger a change away from these settings, ML3 monitors the input image stream until it determines that conditions similar those previously memorized have been re-established; it then restores the state settings that correspond to those conditions. ML3 decisions take priority over the ML1/ML2 combination until it is manually deactivated.

ML3 needs to learn its mapping on a time scale comparable to the length of time it takes a user to request learning, change attention to a different task and field-of-view, then return to the present task. A reasonable timespan for this could be several minutes; if the user is changing viewpoints more rapidly, then several minutes could elapse during which the user must still employ manual updates before ML3 becomes effective.

A Machine Learning architecture capable of being fully trained for this purpose within that interval is one based on the well-known Support Vector Machine (SVM) paradigm, which predates the maturity of Deep Learning methodology. SVMs have fallen out of favor in recent years because they do not scale as well as Deep Learning machines for the data-intensive problems that ML1 and ML2 were chosen to address. However, unlike DL systems that sport an overwhelming number of free parameters (weights), SVMs possess simple structure and low complexity that engender fast and efficient training algorithms. One variant of SVM is particularly well suited to detecting when inputs are consistent with a set of pre-specified prototypes: the One-Class SVM, distinguished by a single binary-valued output that indicates whether the current input belongs to the class of inputs represented by the training data set.

The One-Class SVM is often used as an outlier or anomaly detector, flagging instances when its input is not recognized as belong to its class. Since the output is strictly binary, it is equally effective at detecting class membership as well. Its effectiveness depends on how well the training data represents the entire class to be recognized. Best results will be obtained when the SVM is trained using multiple different images. To this end, ML3 is continually updated by adding new images to the training ensemble and periodically re-computing the network. Suitable images are collected by the Coordinator at regular intervals (when head movement is sufficiently small) after the user first activates ML3 and until ML1/ML2 again come into play. They can also be taken after ML3 restores its memorized settings if the user does not countermand its decision with further manual inputs; thus ML3 and the user continually collaborate to maintain accuracy. Training complexity can be managed by limiting the size of the training set, with priority given to more recent imagery and inputs proximal to direct user inputs.

Like the other Machine Learning systems, the inference for ML3 is easily implemented efficiently on a wearable device with limited computing resources. In this case, it is also possible to include the learning aspects of ML3 on the device as well. However, it may be preferable to upload images to a faster remote processor or processors for higher speed and lower power consumption because real-time performance is not a requirement; on-board processing is always available as a fallback when connectivity is lost.

Like ML2, ML3 can also share the features produced by ML1 to reduce the burden on the SVN, which has finite representational capability. Traditional SVMs are not organized as layers of processing units, but the output of any ML1 processing unit can be directly used as an additional input to an SVM. Although the reuse of shared network "hardware" is novel, the idea of multi-layer networks as a preprocessor that feeds the inputs of an SVM has been explored in ML literature as the "Multi-Layer SVM."

Note that the ML3 SVM configured as a One-Class classifier is not robust enough simply to replicate a large number of times, with each instance assigned to detect a different viewing condition with its own set of device state; it cannot be a viable fast replacement for ML2. There would be no guarantee that multiple SVMs would not respond affirmatively to a single input image because the boundaries between class members and outliers found by the training algorithm are (deliberately) not directly constrained, and will not generally correspond with human intuition unless moderately large training data sets can be employed. It is a reasonable solution for its intended purpose as a stop-gap solution for recognizing one or two ad-hoc configurations that repeat and remain individually consistent across a series of context-switches that occur at human-interaction timescales.

Finally, note that ML3 scene recognition is useful for qualifying training inputs for ML2. When the user does not intervene to express disapproval, any scene that ML3 recognizes is an opportunity to update the training set for ML2. The Controller is responsible for managing this aspect of ML2/ML3 interaction.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The terms "a," "an," "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the invention so claimed are inherently or expressly described and enabled herein.

As one skilled in the art would recognize as necessary or best-suited for performance of the methods of the invention, a computer system or machines of the invention include one or more processors (e.g., a central processing unit (CPU) a graphics processing unit (GPU) or both), a main memory and a static memory, which communicate with each other via a bus.

A processor may be provided by one or more processors including, for example, one or more of a single core or multi-core processor (e.g., AMD Phenom II X2, Intel Core Duo, AMD Phenom II X4, Intel Core i5, Intel Core i& Extreme Edition 980X, or Intel Xeon E7-2820).

An I/O mechanism may include a video display unit (e.g., a liquid crystal display (LCD) or a cathode ray tube (CRT)), an alphanumeric input device (e.g., a keyboard), a cursor control device (e.g., a mouse), a disk drive unit, a signal generation device (e.g., a speaker), an accelerometer, a microphone, a cellular radio frequency antenna, and a network interface device (e.g., a network interface card (NIC), Wi-Fi card, cellular modem, data jack, Ethernet port, modem jack, HDMI port, mini-HDMI port, USB port), touchscreen (e.g., CRT, LCD, LED, AMOLED, Super AMOLED), pointing device, trackpad, light (e.g., LED), light/image projection device, or a combination thereof.

Memory according to the invention refers to a non-transitory memory which is provided by one or more tangible devices which preferably include one or more machine-readable medium on which is stored one or more sets of instructions (e.g., software) embodying any one or more of the methodologies or functions described herein. The software may also reside, completely or at least partially, within the main memory, processor, or both during execution thereof by a computer within system, the main memory and the processor also constituting machine-readable media. The software may further be transmitted or received over a network via the network interface device.

While the machine-readable medium can in an exemplary embodiment be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. Memory may be, for example, one or more of a hard disk drive, solid state drive (SSD), an optical disc, flash memory, zip disk, tape drive, "cloud" storage location, or a combination thereof. In certain embodiments, a device of the invention includes a tangible, non-transitory computer readable medium for memory. Exemplary devices for use as memory include semiconductor memory devices, (e.g., EPROM, EEPROM, solid state drive (SSD), and flash memory devices e.g., SD, micro SD, SDXC, SDIO, SDHC cards); magnetic disks, (e.g., internal hard disks or removable disks); and optical disks (e.g., CD and DVD disks).

Furthermore, numerous references have been made to patents and printed publications throughout this specification. Each of the above-cited references and printed publications are individually incorporated herein by reference in their entirety.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

What is claimed is:

1. A method of presenting images to a user of a visual aid device, comprising the steps of:
   capturing real-time video images of a scene with a camera of the visual aid device;
   inputting at least one of the real-time video images into a classifier of the visual aid device;
   in the classifier, analyzing the at least one of the real-time video images to select a display state template that is appropriate for the scene;
   inputting the display state template and at least one of the real-time video images into a machine learning system of the visual aid device;
   in the machine learning system, determining if a user-preferred device configuration exists for the scene and, if the user-preferred device configuration exists, modifying the display state template based on the user-preferred device configuration;
   applying parameters that accompany the display state template to the real-time video images to produce modified images;
   presenting the modified images to the user on a display of the visual aid device.

2. The method of claim 1, wherein the display state templates are selected from the group consisting of a wide template, an intermediate template, and a close template.

3. The method of claim 1, wherein applying parameters that accompany the display state template comprises adjusting a magnification of at least a portion of the real-time video images.

4. The method of claim 1, wherein the display state template comprises a wide display state template and wherein applying parameters that accompany the display state template further comprises applying no magnification to the real-time video images.

5. The method of claim 1, wherein the display state template comprises an intermediate display state template and wherein applying parameters that accompany the display state template further comprises applying moderate magnification to at least a portion of the real-time video images.

6. The method of claim 1, wherein the display state template comprises a close display state template and wherein applying parameters that accompany the display state template further comprises applying high magnification to at least a portion of the real-time video images.

7. The method of claim 6, further comprising applying high magnification over most of the real-time video images.

8. The method of claim 1, wherein the display state template comprises a central display state template and wherein applying parameters that accompany the display state template further comprises applying increased central magnification to the real-time video images.

9. The method of claim 8, further comprising tapering the central magnification to neutral at edges of the real-time video images.

10. The method of claim 1, wherein prior to inputting the selected display state template and at least one of the real-time video images into the machine learning system, the method further comprises training the machine learning system to determine the user-preferred device configuration for a variety of scenes.

11. The method of claim 10, wherein training the machine learning system further comprises evaluating prior situations in which the user made manual adjustment to settings corresponding to the selected display state template and at least one of the real-time video images.

12. The method of claim 1, further comprising receiving an input from the user to provide an immediate but temporary learning in a second machine learning system of an association between the scene and the display state template.

13. The method of claim 12, wherein the input is received by a button on the visual aid device.

14. The method of claim 1, wherein the classifier identifies individual image features useful for selecting the display state template.

15. The method of claim 1, further comprising, prior to the presenting step:
   evaluating real-time sensor data of the visual aid device with the processor; and
   wherein presenting the modified images to the user further comprises presenting the modified images to the user on a display of the visual aid device only if the visual aid device is not being subjected to significant rotation or acceleration.

* * * * *